Jan. 20, 1970  J. T. DENNIS  3,490,772
AUTOMATIC RECORD CHANGER
Original Filed March 15, 1963  10 Sheets-Sheet 1

INVENTOR.
JAMES T. DENNIS
BY, *Mason, Kolehmainen,*
*Rathburn and Wyss;*
ATTORNEYS.

INVENTOR.
JAMES T. DENNIS

United States Patent Office 3,490,772
Patented Jan. 20, 1970

3,490,772
AUTOMATIC RECORD CHANGER
James T. Dennis, 812 American National Bldg.,
Oklahoma City, Okla. 73102
Original application Mar. 15, 1963, Ser. No. 265,421, now
Patent No. 3,321,205, dated May 23, 1967. Divided and
this application May 22, 1967, Ser. No. 639,992
Int. Cl. G11b 17/16
U.S. Cl. 274—10                                     8 Claims

ABSTRACT OF THE DISCLOSURE

An automatic record changer for automatically playing a record on the turntable and repeated manual playing of a record without scratching it. The positioning of the balance arm of the automatic record changer controls the tone arm indexing mechanism for manually playing a single record of any size and the tone arm is automatically lowered onto the record repeatedly without scratching it. The balance arm is moved to a position generally above the lead-in groove of a record of a given diameter which causes the changer to play this record repeatedly while the tone arm is indexed automatically to the correct position at the start of each playing cycle.

---

This application is a division of my copending application Ser. No. 265,421, filed Mar. 15, 1963, now Patent No. 3,321,205.

The present invention relates to automatic phonograph apparatus, and, more particularly to a new and improved automatic record changer for phonograph apparatus.

In present day automatic record changers it is customary to provide a so-called manual play arrangement wherein the balance arm, which is normally placed on top of the record stack, is moved upwardly and outwardly to a position over the tone arm so that one record can be manually placed on the turntable and played in the manner of a manual player. In these arrangements the tone arm is usually indexed in accordance with the position of an indexing member which is struck by the outer edge portion of a record as it is deposited on the turntable during the record changing cycle. Accordingly, when the changer is used for manual playing, in which case the tone arm indexing member is not in operation when the record is deposited manually on the turntable before the record changing cycle is initiated, the automatic changing mechanism brings the tone arm to a position over the turntable and lowers it irrespective of the size of the record on the turntable, which necessitates manual readjustment of the tone arm. A further disadvantage in many changers has been the fact that should an automatic cycle be initiated without a record on the changer the tone arm will be dropped onto the rotating turntable with consequent damage to the stylus. Also, even if a record is present on the turntable the tone arm may be deposited at some point other than the lead-in groove of the record, unless the record has a seven inch diameter, so that the operator must manually place the tone arm on the record with the consequent danger of scratching the same. This defect has markedly reduced the attractiveness of most automatic record changers for manually playing a record and has led many people to employ a single record player when a record is to be played manually since these players usually provide a lowering device for moving the stylus into engagement with the record without scratching the same.

In many instances, it is also desirable to provide a simple arrangement in which a single selected record may be placed on the turntable and played over and over again automatically. For example, in the classroom and educational work, the studying of languages, dancing instruction, and similar situations, it would be desirable to provide a repeat play arrangement in which a particular record could be played over and over again automatically and without requiring further attendance after the record is placed on the turntable. Furthermore, this repeat play arrangement should include facilities whereby a record of any of the standard diameters may be played repeatedly. While certain changers heretofore proposed have provided an arrangement for repeatedly playing one record, these arrangements have in general been limited to the repeated playing of records of only one size. Also, these arrangements have been quite complicated and have required the provision of additional control knobs or levers which must be actuated to place the changer in a repeat play condition.

It is, therefore, one of the important objects of the present invention to provide an automatic record changer in which improved and simplified facilities are provided for repeatedly playing a record on the turntable in a fully automatic manner.

It is another object of the present invention to provide a new and improved automatic record changer wherein improved facilities are provided for manually playing a single record without scratching the record.

It is a further object of the present invention to provide a new and improved automatic record changer in which movement of the balance arm to a position generally above the lead-in groove of a record is employed to cause the changer to play this record over and over again without further attendance on the part of the operator.

It is a still further object of the present invention to provide a new and improved automatic record changer wherein positioning of the balance arm is employed to control tone arm indexing so that a single record of any size may be played manually and the tone arm automatically lowered into engagement with the lead-in groove thereof without scratching the record.

It is another object of the present invention to provide a new and improved automatic record changer in which movement of the balance arm to a position generally above the lead-in groove of a record of any standard diameter is employed to cause the changer to play this record repeatedly and to index the tone arm for engagement with the lead-in groove of this record in an automatic manner.

It is a further object of the present invention to provide a new and improved automatic record changer in which the balance arm is provided with a series of detent positions corresponding to the diameters of seven inch, ten inch and twelve inch records and in each of these detent positions the changer is arranged to play repeatedly a record of a diameter corresponding to the detent position of the balance arm.

It is a still further object of the present invention to provide a new and improved automatic record changer wherein means are provided responsive to movement of the balance arm to a position remote from the spindle for causing the tone arm to be indexed to a position corresponding to twelve inch records irrespective of the presence or absence of a record on the turntable or the diameter of such record.

Another object of the present invention is to provide a new and improved automatic record changer wherein means are provided responsive to the positioning of the balance arm in the vicinity of the tone arm rest post for indexing the tone arm so that it is lowered at a point beyond the edge of the turntable irrespective of the actual diameter of the record being played.

A further object of the present invention is to provide a new and improved automatic record changer wherein the tone arm indexing member is automatically moved to the twelve inch record position in response to movement of the balance arm to a position in the vicinity of the tone arm rest post so that the tone arm is indexed to a position corresponding to twelve inch records irrespective of the actual diameter of the records deposited on the turntable.

FIG. 9 is a sectional view taken along the line 18—18 of FIG. 8;

Figures 1, 1A:
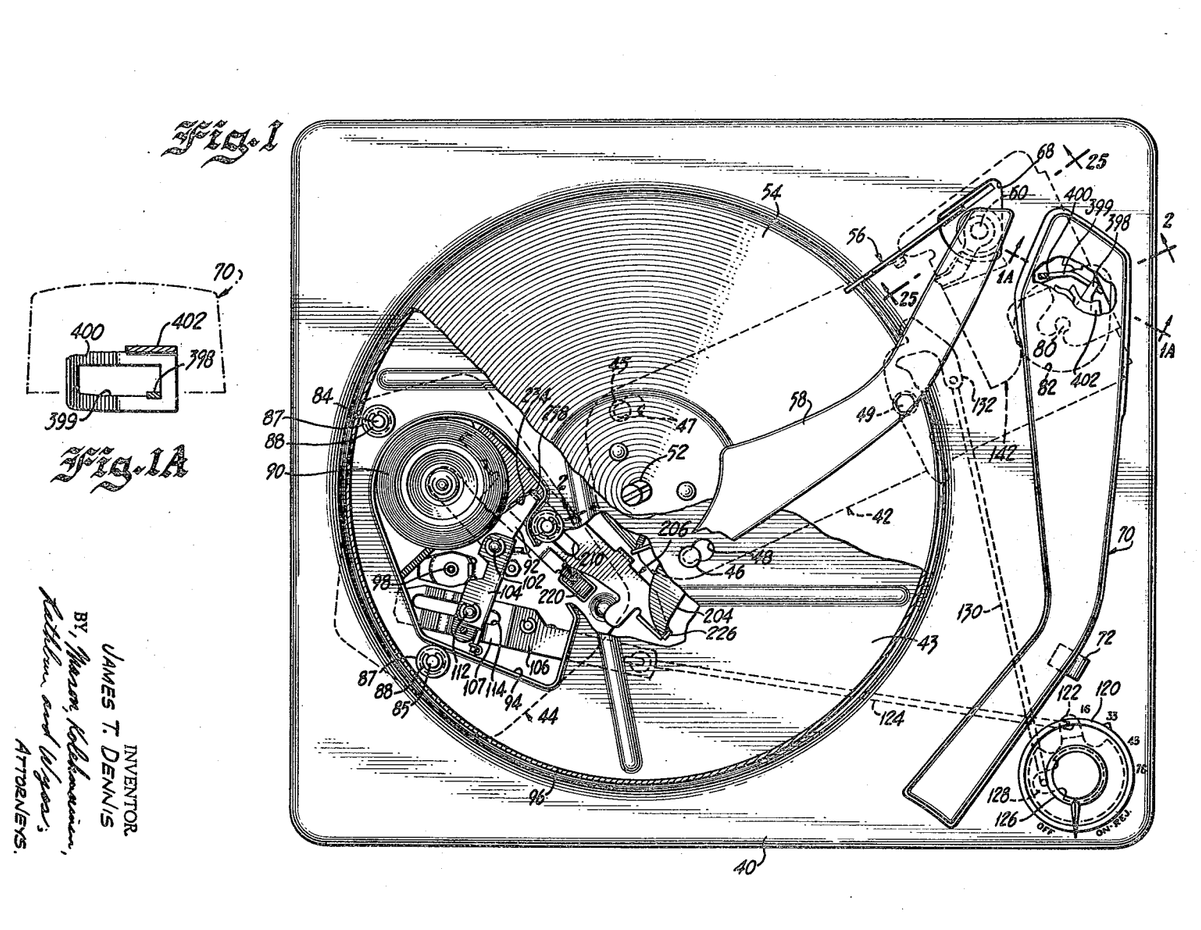
FIG. 1 is a plan view of an automatic record changer embodying the features of the present invention and showing the parts of the changer in rest position.
FIG. 1A is a fragmentary sectional view taken along the lines 1A—1A of FIG. 1.
Figure 2:
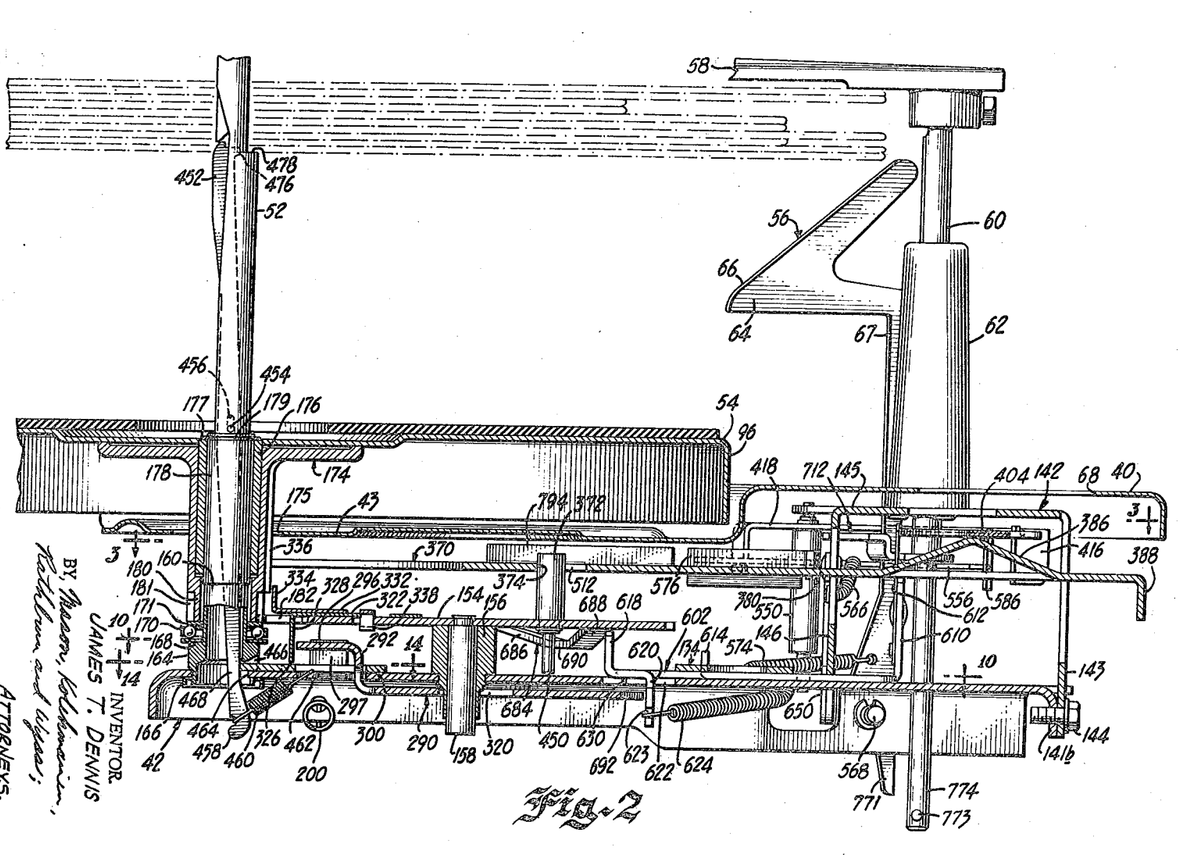
FIG. 2 is a fragmentary side elevational sectional view taken along the lines 2—2 of FIG. 1.

Referring now to the drawings, and more particularly to FIGS. 1, 1A and 2–15 thereof, the automatic record changer of the present invention is therein illustraed as comprising a main base plate 40 (FIG. 1) on which is mounted a main base subassembly indicated generally in outline at 42 and a motor subassembly indicated generally in outline at 44. The main base assembly 42 is mounted on a depressed central portion 43 of the main base plate 40 by means of a pair of mounting posts 45 and 46 the upper ends of which are positioned within keyhole openings 47 and 48, and a main mounting screw 49 which threads into the mounting post 50 (FIG. 3) on the main base subassembly 42. The main base subassembly 42 includes a record supporting spindle 52 on the hub of which is rotatably mounted a turntable 54. The subassembly 42 also includes, a pivotally mounted tone arm indexing member 56 and a balance arm 58. The arm 58 is arranged to be moved inwardly to a position adjacent the spindle 52 to maintain a stack of records positioned on this spindle in horizontal position and may be moved outwardly beyond the record stack when it is desired to remove records from the turntable 54. The balance arm 58 is mounted on the upper end of a balance arm shaft 60 which is slidably and rotatably mounted in a generally cylindrical bearing housing 62 which is mounted on the main base subassembly 42. As shown in FIG. 2, the tone arm indexing member 56 is provided with head portion 64 having an inclined edge portion 66 which is adapted to be struck by the outer edge portion of records of ten and twelve inch diameters when they are released by the spindle 52 to the turntable 54. The head portion 64 is connected to a shank portion 67 which is pivotally mounted on the main base subassembly 42, as will be described in more detail hereinafter. Both the shank portion 67 and the housing 62 extend through a clearance opening 68 in the main base plate 40.

Figure 3:
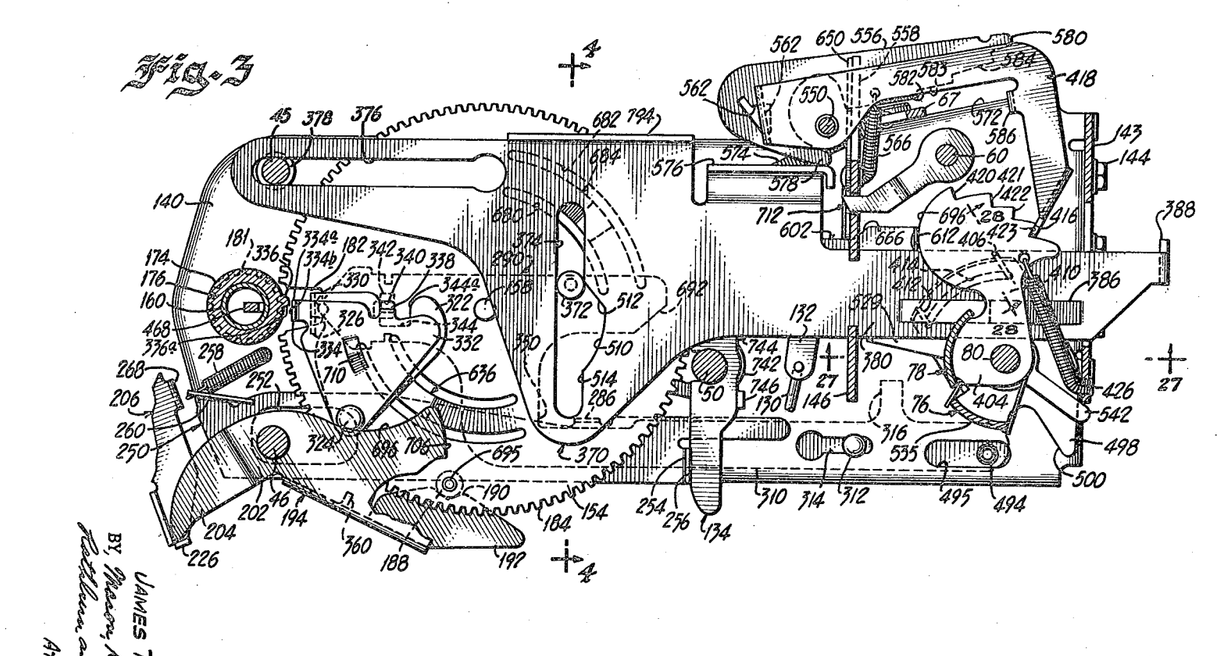
FIG. 3 is a fragmentary, sectional plan view taken along the lines 3—3 of FIG. 2.
Figure 4:
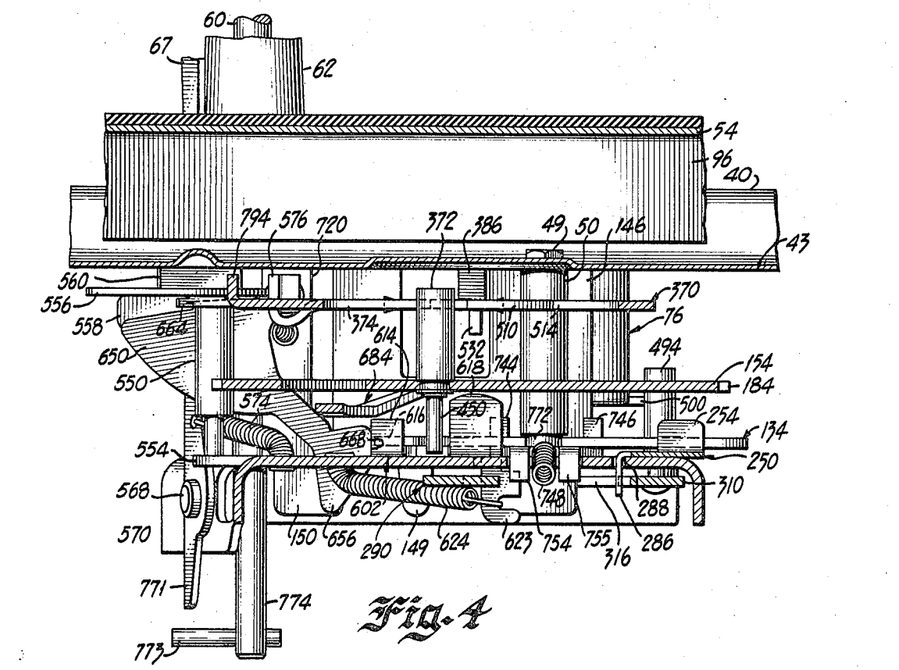
FIG. 4 is a fragmentary sectional view taken along the lines 5—5 of FIG. 3.

A tone arm assembly indicated generally at 70 is also pivotally mounted on the main base subassembly 42 and is arranged to be positioned on a rest post 72, secured to the base plate 40, when the record changer is not in use. Movement of the tone arm assembly 70 is controlled by means of a U-shaped tone arm bracket 76 (FIG. 5) and a U-shaped tone arm index bracket 78 which are pivotally mounted on a tone arm pivot post 80 (FIG. 3). A clearance opening 82 in the main base plate 40 is provided for the members 76, 78 and 80 so that the tone arm assembly 70 is supported solely on the main subassembly 42 and vibrations of the main base plate 40 in the vicinity of the opening 82 are not transmitted to the tone arm assembly 70.

The motor subassembly 44 is supported beneath the central depressed portion 43 of the base plate 40 by means of three studs 84, 85 and 86 which are held within rubber grommets 87 by means of the C-washers 88 so that the subassembly 44 is floatingly mounted beneath the base plate portion 43. The subassembly 44 includes an idler wheel 90 which is rotatably mounted on one arm of a bell crank lever 92 and extends through an opening 94 formed in the central base plate portion 43 so that the idler wheel 90 can be moved into engagement with the rim 96 of the turntable 54 and the stepped drive shaft 98 of the motor (not shown) which is mounted to the underside of the subassembly 44. As best illustrated in FIG. 1, the drive shaft 98 is provided with a series of turret steps suitable for driving the turntable at standard speeds of 16⅔ r.p.m., 33⅓ r.p.m., 45 r.p.m. and 78 r.p.m. The bell crank 92 is rotatably mounted on a post 102 (FIG. 1) mounted on one end of a connecting link 104 of U-shaped cross section the vertical position of which is controlled by means of a speed control cam member 106 having a plurality of stepped portions 107, 108, 109 and 110 corresponding to the different turntable speeds. The lever 104 is rotatably mounted on a post 112 secured to the subassembly 44 which is positioned within a clearance slot 114 in the speed cam 106 so that as the cam 106 is reciprocated the idler subassembly including the lever 104, the bell crank 92 and the idler wheel 90 will be moved into alignment with different steps of the drive shaft 98.

In order to change the speed of rotation of the turntable 54 an outer control knob 120 is rotatably mounted on the main base plate 40 and is provided with an arm portion 122 beneath this base plate to which is secured one end of a speed control rod 124. The other end of the rod 124 is connected to the speed control cam 106 so that rotation of the knob 120 is effective to reciprocate the cam 106 and move the idler 90 into position with different steps on the turret 98.

An inner control knob 126 is also rotatably mounted on the base plate 40 and is provided with an arm portion 128 beneath this base plate to which is connected one end of a control rod 130. The other end of the control rod 130 is connected to an offset arm portion 132 of a control lever indicated generally at 134 which is pivotally mounted on the post 50 of the main base assembly 42, as will be described in more detail hereinafter. The control knob 126 is mechanically detented to the intermediate position shown in FIG. 1 by means of the control linkage of the present invention and when this knob is rotated in a counterclockwise direction to an ON-REJECT position the record changer is either turned on, or, if previously turned on a record changing cycle is initiated, as will be described in more detail hereinafter. When the control knob 126 is rotated in a clockwise direction to an OFF position an automatic shutoff cycle is initiated at the end of which cycle the tone arm assembly 70 is positioned on the rest post 72, the motor 100 is turned off and the idler wheel 90 is withdrawn to the neutral position shown in FIG. 1 in which it is not in engagement with either the turntable rim 96 or the drive shaft 98.

Considering now in more detail the main base subassembly 42, this subassembly includes a main base member 140 (FIG. 2) in the form of a flat plate having downturned flange portions 141 and 141a along the sides thereof to strengthen the member 140, and a main bracket 142 of generally U-shaped configuration one vertical wall portion 143 of which is connected to the end flange portion 141b of the member 140 by means of the screws 144. The other vertical wall portion 146 of the bracket 142 is provided with a series of tongue portions 148, 149 and 150 (FIG. 9) which extend through suitable apertures in the base member 140, the wall 146 of the bracket 142 being secured in place by means of the spring washer 152.

A main cycling gear 154 is rotatably mounted on the base member 40 in such manner that this gear may be bodily elevated during rotation to provide an automatic shutoff action, as will be described in more detail hereinafter. To this end, a bearing 156 is secured to the base member 140 and a gear shaft 158 is positioned within the bearing 156 and is secured to the gear 154 by any suitable means.

Movement of the gear 154 during the record changing cycle is employed to reciprocate a main cycling slide indicated generally at 370 (FIG. 3) and movement of the slide 370 is employed to control movement of the tone arm 70 during the record changing cycle so that the tone arm is lifted off of a record on the turntable, is moved outwardly to a position adjacent the rest post 72, and is then moved inwardly to a correctly indexed position corresponding to the diameter of the record released during the record changing cycle and is lowered onto the surface of this record to initiate the playing cycle. To accomplish this reciprocating movement of the slide 370, a driving pin 372, which is secured to the main gear 154 and extends upwardly therefrom is positioned within a transverse slot 374 in the slide 370. The forward end of the cycling slide 370 is mounted for reciprocating movement on the base member 140 by means of a slot 376 the edges of which ride on a groove 379 formed in the main mounting stud 45. The rearward portion 380 of the slide 370 is slidably positioned in a pair of notches 382 and 383 (FIG. 9) formed in the vertical edges of an opening 384 in the side wall 146 of the main bracket 142.

In order to control vertical movement of the tone arm 70, the slide portion 380 is provided with an inclined ramp portion 386 which is struck up out of the main plane of the slide 370. Also, a downturned end flange 388 on the end of the slide is employed to control inward and outward movement of the tone arm during the record changing cycle. More particularly, the U-shaped tone arm bracket 76 is pivotally supported on the end of the tone arm pivot 80 by means of a transverse pin 390 (FIG. 5) which rests on the rounded upper end of the pivot pin 80 and extends between a pair of upstanding ears 392 and 394 formed in the upper flange of the bracket 76. The tone arm indexing bracket 78 is pivotally mounted on the pin 80 and is also arranged for vertical sliding movement along this pin. The tone arm assembly 70 is mounted for pivotal movement about the pin 390 so that the tone arm can be raised and lowered. Thus, the upper flange 396 of the tone arm indexing bracket 78 is provided with an offset tongue portion 398 which is positioned within a slot 399 in the depending rear flange 400 of the tone arm pivot bracket 402 which is pivotally mounted on the ends of the pin 390 and connected to the tone arm assembly 70.

Figure 14:
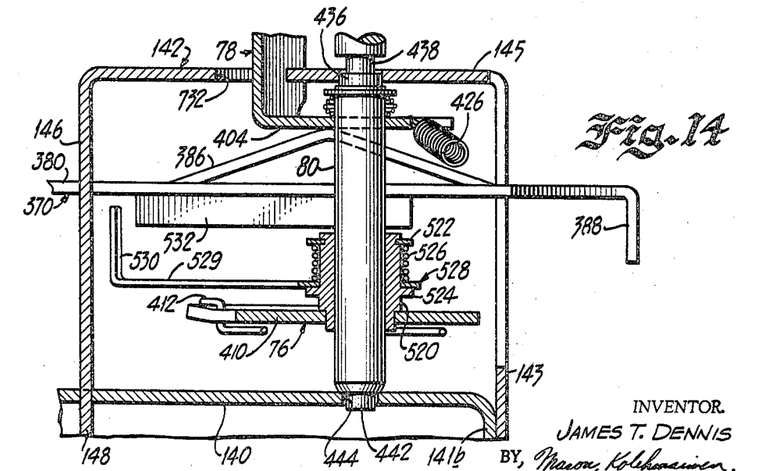
FIG. 14 is a sectional view taken along the lines 27—27 of FIG. 3.

The bottom flange portion 404 of the tone arm indexing bracket 78 is arranged to ride on the inclined surface 386 of the slide 370 so that when the slide is moved forwardly at the beginning of the record changing cycle the tone arm indexing bracket 78 is moved downwardly from the position shown in FIG. 14. This downward movement of the bracket 78 causes the tongue portion 398 thereof to engage the bottom edge of the slot 399 in the flange 400 of the bracket 402 and exert a downward force on the rear of the tone arm assembly so that the stylus is lifted off the record. As the slide 370 continues to move forwardly during the first half of the record changing cycle the flange 388 engages the offset end portion 406 (FIG. 15) of a U-shaped safety spring 408 which is mounted on the underside of the bottom flange 410 of the tone arm bracket 76, the other end 412 of the spring 408 being positioned in the other end of a slot 414 in the bottom flange 410, and pivots the tone arm bracket 76 about the pivot post 80 so that the tone arm assembly 70 is moved outwardly beyond the edge of the largest record. As the tone arm bracket 76 is thus rotated, the indexing bracket 76 remains fixed and the tongue 398 rides on the bottom edge of the slot 399 until a notch in the slot 399 is encountered into which the tongue 398 drops and thereafter the tone arm indexing bracket 78 rotates with the tone arm bracket 76 until the tone arm is lowered onto a record.

The bottom flange 404 of the indexing bracket 78 is provided with a series of indexing steps which are adapted to be engaged by the tip portion 416 of an index pawl 418 the position of which is set in accordance with movement of the indexing member 56 which is struck by the edge of a record as it is released to the turntable. Thus, a seven inch indexing step 420 is provided on the flange 404, a ten inch indexing step 421, a twelve inch indexing step 422 and a rest position indexing step 423, it being understood that the tone arm indexing bracket 78 is shown in the rest position in FIG. 3 in which position the index pawl 418 is in engagement with the rest position step 423 in which position the tone arm assembly 70 is positioned on the rest post 72. The tone arm indexing bracket 78 is spring biased to hold any one of the steps 420–423 in engagement with the pawl 418 by means of a spring 426 which is connected between the bottom flange 404 of the bracket 78 and the side wall 143 of the main bracket 142.

The functioning and operation of the tone arm bracket 76 and the tone arm indexing bracket 78, in conjunction with the index pawl 418 is generally similar to that described in my application Ser. No. 168,305 filed Jan. 16, 1962, now Patent No. 3,254,896, which is a continuation of my earlier application Ser. No. 752,969, filed Aug. 4, 1958, and hence a detailed description of the functioning of this portion of the changer is considered unnecessary herein.

Figure 6:
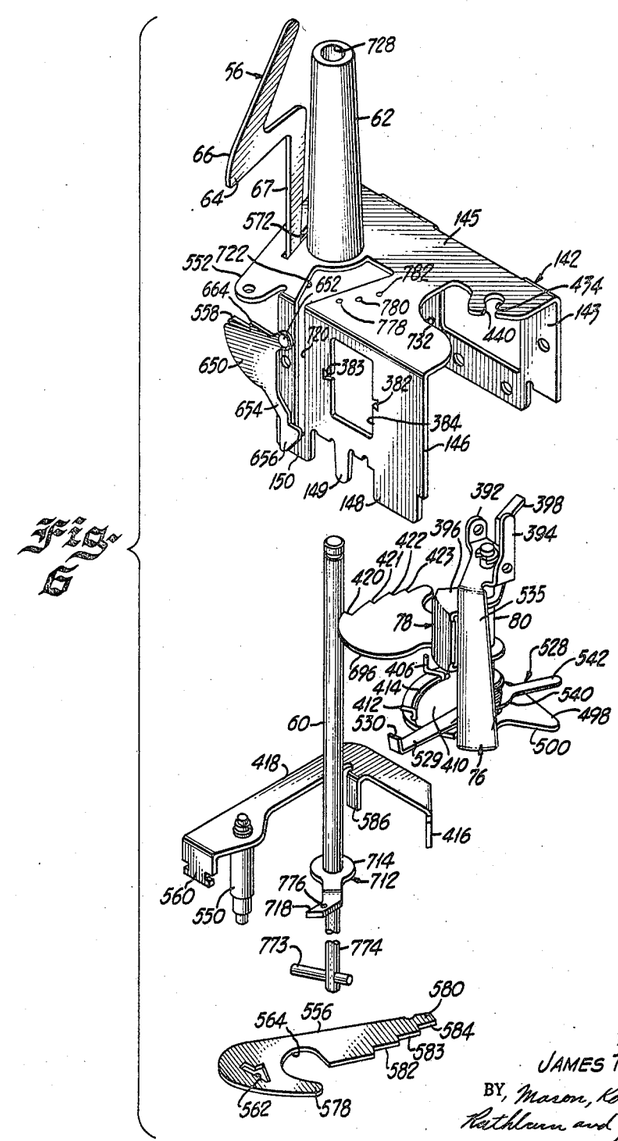
FIG. 6 is an exploded view showing the tone arm mounting and indexing mechanism of the main base subassembly of FIG. 5.
Figure 7:
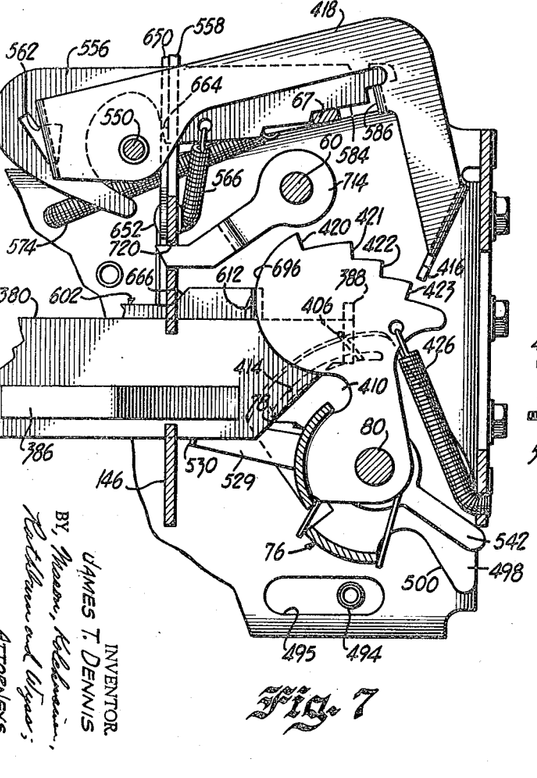
FIG. 7 is a fragmentary plan view of the tone arm indexing portion of FIG. 3 shown in the twelve inch record indexing position.

Considering now the tone arm indexing mechanism of the record changer of the present invention, as described generally heretofore, facilities are provided for indexing the tone arm assembly 70 in response to the dropping of a record so that the stylus is correctly positioned to be lowered into the lead-in groove of records of each of the three standard diameters, i.e., seven inch, ten inch and twelve inch diameters. More particularly, the index pawl 418 is secured to the upper end of a post 550 (FIG. 6). The post 550 is pivotally mounted in a vertical position between an ear portion 552 formed in the top wall of the main bracket 142 and an ear portion 554 (FIG. 4) projecting horizontally from the main base member 140, so that the pawl 418 is mounted for pivotal movement in a horizontal plane about the post 550. Positioned beneath the pawl 418 is an index pawl stop 556 which normally rests on the upper edge of a sidewardly extending portion 558 of the side wall 146 of the main bracket 142. The pawl stop 556 is pivotally connected to one end of the pawl 418 by providing a downwardly extending notched tongue portion 560 on the end of pawl 418 which fits into a generally V-shaped notch 562 in the pawl stop 556.

Figures 12, 13:
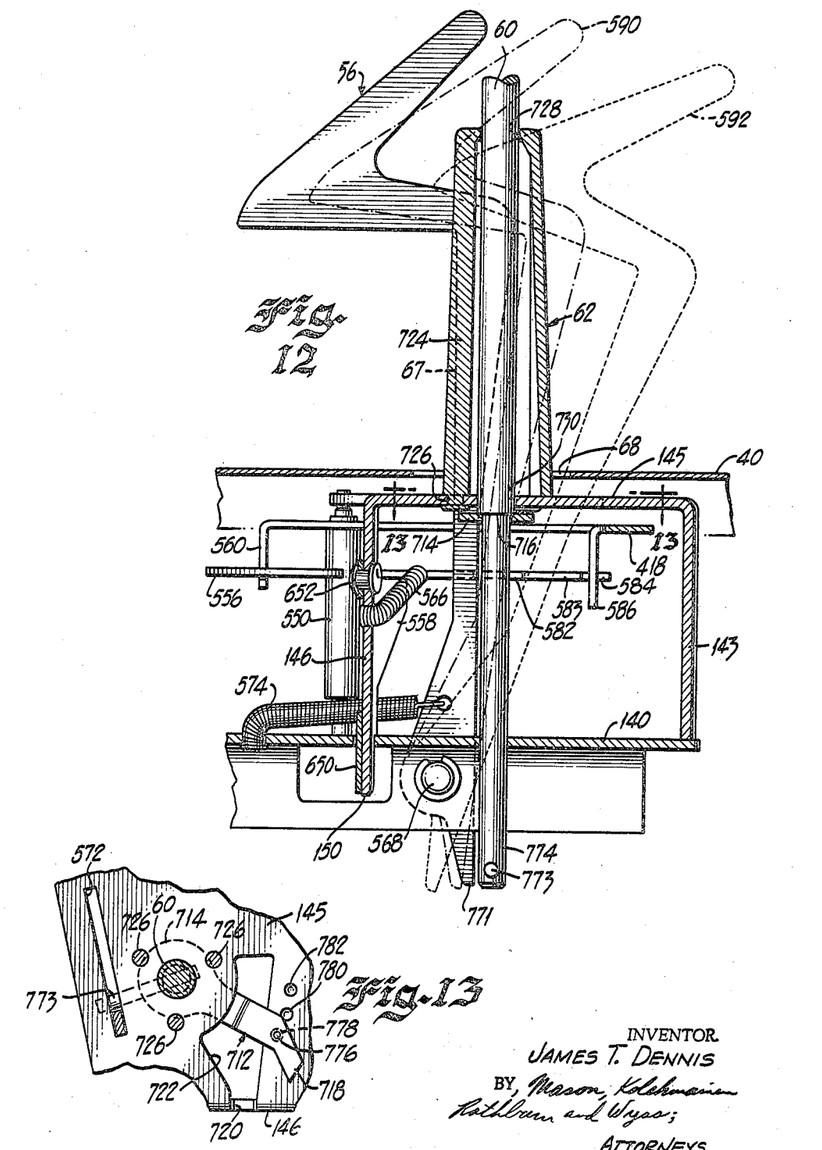
FIG. 12 is a fragmentary sectional view taken along the lines 25—25 of FIG. 1 illustrating the indexing positions of the tone arm indexing member.
FIG. 13 is a fragmentary plan view taken along the lines 26—26 of FIG. 12.

The pawl stop 556 is also provided with a large clearance notch 564 around the post 550 so that the pawl stop 556 may be pivoted about the post 550 without touching the same. The pawl stop 556 is spring biased by means of a spring 566 which is connected between the pawl stop 556 and the side wall 146 of the main bracket 142. The tone arm indexing member 56 which is struck by ten or twelve inch records as they are deposited on the turntable, is pivotally mounted on a stud 568 (FIG. 10) which is positioned on an offset downturned flange portion 570 of the base member 140 and the shank portion 67 of the member 56 extends through a slot 572 (FIG. 3) in the top wall 145 of the main bracket 142. The member 56 is normally spring biased to the forward end of the slot 572 by means of a spring 574 which is connected from a point on the shank 67 somewhat above the stud 568 to the base member 140, as best illustrated in FIG. 12.

Considering now the operation of the above described tone arm indexing mechanism, when the cycling slide 370 is in the rest position shown in FIG. 3 on upturned flange portion 576 thereof is in engagement with a shoulder 578 on the index pawl stop 556 so that the tip portion 580 of the pawl stop 556 is pivoted outwardly, as illustrated in FIG. 3. In FIG. 3 the pawl 418 is shown positioned in engagement with the rest position step 423 on the bottom flange 404 of the tone arm index bracket 78, thus indicating that the tone arm is positioned on the rest post 72. When a record changing cycle is initiated and the cycling slide 370 moves forwardly, the flange 576 is removed from engagement with the shoulder 578 with the result that the spring 566 pivots the pawl stop 556 into engagement with the side of the shank portion 67 of the indexing member 56. The pawl stop 556 is provided with a seven inch indexing step 582, a ten inch indexing step 583 and a twelve inch indexing step 584 (FIG. 3). Accordingly, when the pawl stop 556 is thus moved by the spring 566 the step 582 will engage the shank portion 67 since at this point in the cycle the new record has not been released to the turntable.

The pawl 418 remains held in engagement with the rest position step 423 by means of the spring 426 at the beginning of the record changing cycle. However, when the tone arm indexing bracket 78 becomes registered with the tone arm bracket 76, by engagement of the tongue 398 in the notch 415 of the bracket 400, the tone arm indexing bracket 78 moves with the tone arm bracket 76 and is pivoted about the post 80 in a counterclockwise direction as viewed in FIG. 3 against the force of the spring 426 so that the pawl 418 is released. At the time the pawl 418 is released the step 582 on the pawl stop 556 is in engagement with the shank 67 so that the spring 566 exerts a force on the pawl stop 556 which is transmitted to the rear pivot 560, 562 and causes the pawl 418 to pivot in a counterclockwise direction about the post 550 (as viewed in FIG. 3) until a downturned flange 586 on the pawl 418 engages the tip 580 of the pawl stop 556.

When the pawl 418 is thus registered with the pawl stop 556 the tip portion 416 of the pawl 418 is in the path of the seven inch indexing step 420 on the bracket 78. Accordingly, if a seven inch record is deposited to the turntable the indexing member 56 is not struck since, as shown in FIG. 2, the tip of this member is beyond the edge of seven inch records. Under these conditions the step 582 remains in engagement with the shank 67 and the pawl 418 is engaged by the step 420 as the bracket 78 is rotated in a clockwise direction about the post 80 (FIG. 3) when the tone arm is moved inwardly to a position over the lead-in groove of a seven inch record. The tone arm assembly 70 is thus accurately positioned by engagement of the step 420 with the tip 416 of the pawl 418 so that the tone arm stylus is lowered into engagement with the lead-in groove portion of a seven inch record. If, on the other hand, a ten inch record is released to the turntable, the indexing member 56 is struck by the outer edge portion of this record and is moved to the dotted line position 590 shown in FIG. 12. When this occurs, the shank portion 67 is moved rearwardly within the slot 572 to a point sufficient that the step 583 of the pawl stop 556 is urged into engagement with the shank 67. The flange 586 remains in engagement with the tip 580 of the pawl stop 556 with the result that the pawl 418 is now positioned in the path of the ten inch step 421 on the bracket 78, and the tone arm is indexed in the correct position to engage the lead-in groove of a ten inch record. If a twelve inch record is released to the turntable the indexing member 56 is moved to the dotted line position 592 shown in FIG. 12 and the shank 67 of this member is moved to the position shown in FIG. 6 in which position the step 584 of the pawl stop 556 is urged into engagement with the side of the shank 67. Accordingly, the tip portion 416 of the pawl 418 is positioned in the path of the twelve inch step 422 of the bracket 78.

Figure 8:
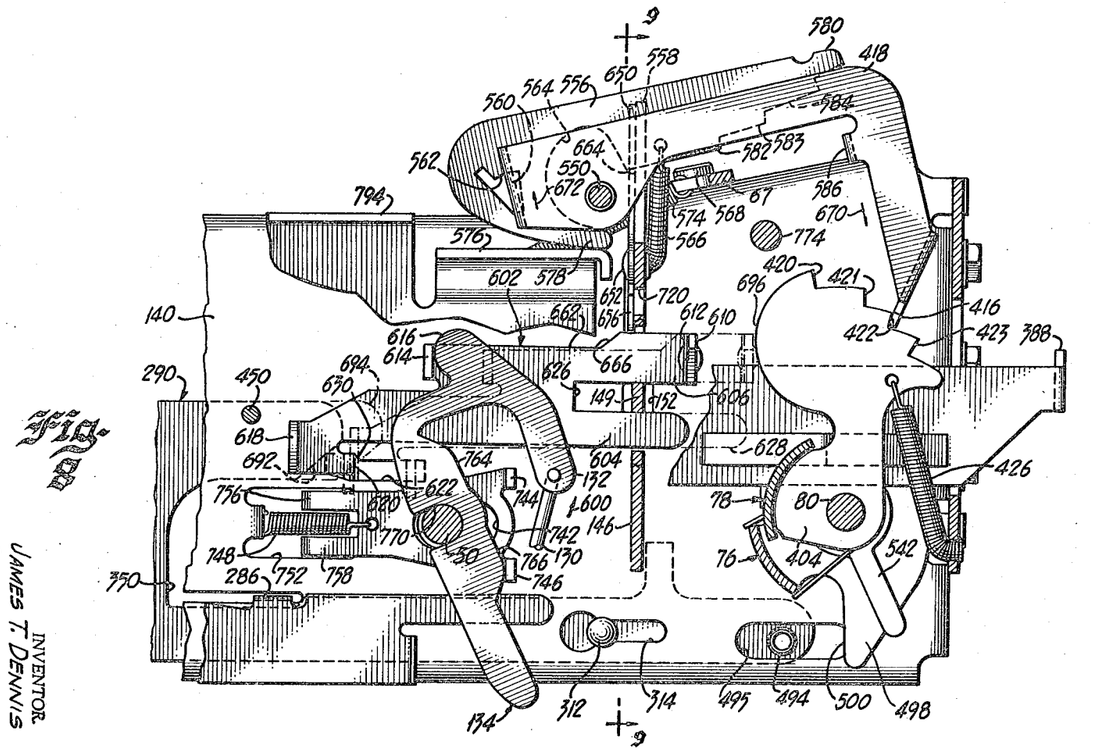
FIG. 8 is a fragmentary plan view of a portion of FIG. 3 with a portion of the cycling slide broken away and showing the control linkage in the off position.

As the control slide 370 moves rearwardly during the last half of the record changing cycle, the bracket 78 is pivoted in a clockwise direction about the post 80 so as to bring the step 422 into engagement with the tip 416 on the pawl 418, as shown in FIG. 8. The spring 426 continues to hold the step 422 in engagement with the pawl tip 416. However, when the cycling slide 370 moves back to its rest position the flange 576 thereof engages the shoulder 578 on the pawl stop 556 and pivots the pawl stop 556 about the pivot 560, 562 to the position shown in FIG. 8. As the pawl stop 556 is thus pivoted away from the shank 67, the spring 574 urges the indexing member 56 forwardly until the shank 67 engages the forward edge of the notch 572. The indexing member 56 is thus repositioned in readiness for indexing the next record deposited on the turntable during the next record changing cycle.

In connection with the tone arm indexing mechanism described thus far, it is pointed out that this mechanism is generally similar to the tone arm indexing mechanism described in detail in my application Ser. No. 168,305 filed Jan. 16, 1962, now Patent 3,254,896, which is a continuation of my earlier application Ser. No. 752,969, filed Aug. 4, 1958, and reference may be had to my Patent No. 3,254,896 for a detailed description of the operation of the same. However, it is pointed out that the mounting of the pawl 418 on the post 550 provides an indexing arrangement which is positive in its action since the post 550 is supported at relatively widely spaced points so that the pawl 418 moves always in a horizontal plane without substantial wobble or tilting of the tip portion thereof. Also, it is pointed out that the pawl 418, post 550 and pawl stop 556 may be conveniently mounted as a separate subassembly at the time the main bracket 142 is assembled by inserting the post 550 into the holes located in the ears 552 and 554 described above.

Figure 5:
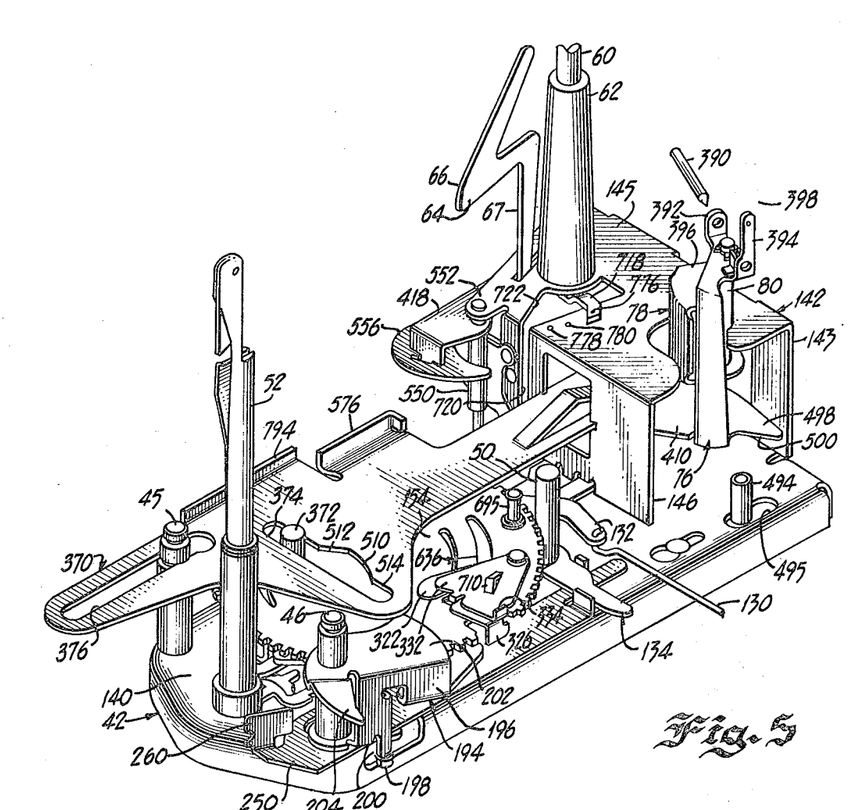
FIG. 5 is a perspective view of the main base subassembly of the record changer of FIG. 1.

The automatic shutoff facilities of the present invention may also be actuated in response to the dropping of the balance arm 58 after the last record of the record stack supported on the spindle 52 has been deposited on the turntable 54. Furthermore, most of the shutoff facilities employed in the manner described heretofore in connection with a shutoff cycle actuated in response to movement of the control lever 134 are employed to achieve this balance arm shutoff arrangement. More particularly, the vertically extending balance arm shaft 60 is slidably and rotatably mounted in the housing 62 and a transversely extending guide arm indicated generally at 712 (FIG. 6) is provided with a hub portion 714 which is positioned on a shoulder 716 (FIG. 12) so that the guide arm 712 is secured to and moves with the shaft 60. The guide arm 712 is provided with an offset end portion 718 which is adapted to move within a vertically extending slot 720 (FIG. 6) provided in the bracket wall 146 of the main bracket 142. The extension 718 is also adapted to rest on the top wall 145 of the main bracket 142 as shown in FIG. 5, an irregularly shaped opening 722 being provided in the top wall 145 to permit such movement.

In order to mount the shaft 60 in a simple and economical manner, the housing 62 is preferably of hollow construction and includes a plurality of vertically extending ribs 724 (FIG. 12) which terminate in locating pin portions 726 which are positioned in accurately located positioning holes in the top wall 145 and are secured to this top wall by any suitable operation such as riveting or the like. An upper bearing surface 728 is provided in the top wall of the housing 62 and the top wall 145 of the bracket 142 is provided with an opening 730 which provides the bottom bearing for the shaft 60. In this manner a pair of widely spaced bearing supports are provided for the shaft 60 while employing a simple and economical construction which may be readily assembled. In this connection it will be understood that the locating studs 726 are accurately positioned on the wall 145 so that the aperture 730 may act as the bottom bearing for the shaft 60. The balance arm 58 is preferably secured to the upper end of the shaft 60 by means of a set screw 732 which pulls the hub portion 734 of the arm 58 into engagement with a flat surface 736 on the shaft 60, as illustrated in FIG. 2.

When a stack of records is to be played, the balance arm 58 is lifted upwardly until the tip 718 of the guide arm 712 clears the upper surface of the top bracket wall 145 whereupon the balance arm may be moved outwardly so that the tip portion 718 rests on the top wall 145. After the records have been placed on the spindle 52 the balance arm is swung inwardly so that the tip thereof is positioned adjacent the spindle 52 and the balance arm 58 is lowered onto the upper surface of the record stack. In this position the guide arm tip 718 is positioned within the slot 720 as shown in FIG. 9.

Figure 10:
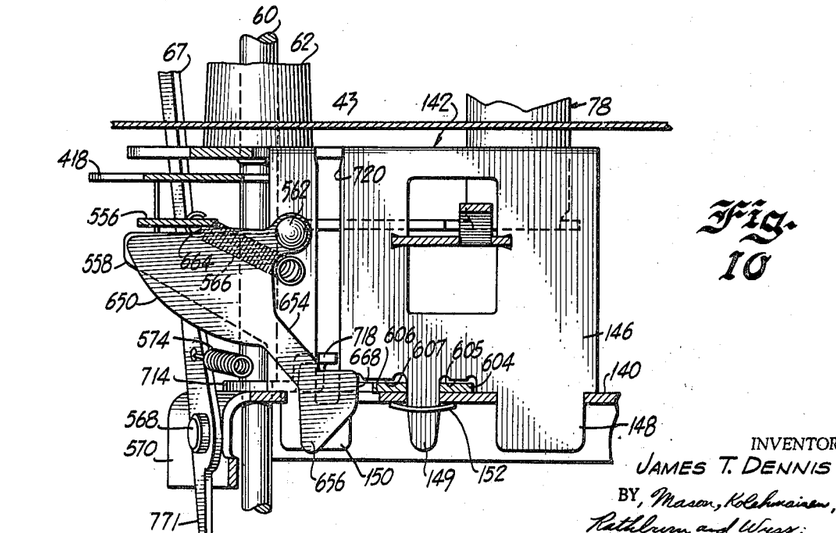
FIG. 10 is a fragmentary, sectional, side elevational view similar to FIG. 9 but showing the actuation of the last record shutoff mechanism in response to movement of the balance arm.
Figures 11, 15:
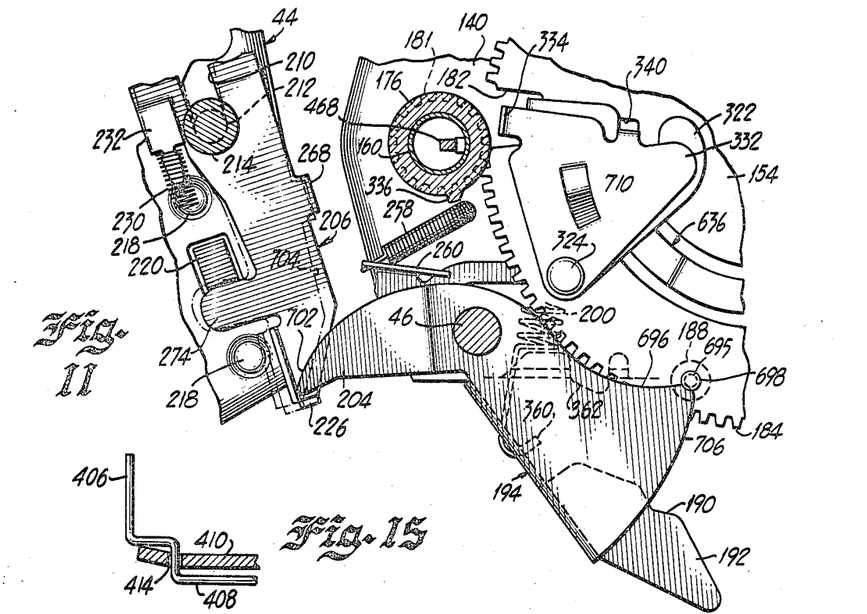
FIG. 11 is a fragmentary plan view illustrating the manner in which the automatic shutoff mechanism is actuated.
FIG. 15 is a sectional view taken along the lines 28—28 of FIG. 3.

As successive records are played, the balance arm moves down proportionately within the slot 720. However, when the last record is released to the turntable, the support for the balance arm 58 is removed so that this arm moves downwardly until the collar 718 strikes the upper surface of the base member 140 as shown in FIG. 10. If desired, a rubber grommet (not shown) may be provided on the underside of the hub portion 718 so that an objectionable striking noise is not heard when the balance arm drops and the collar 714 engages the member 140. When the balance arm drops to the position shown in FIG. 10, the guide arm tip 718 engages the upper edge of the offset portion 654 of the quadrant lever 650 and cams this lever about the pivot 652 to the position shown in FIG. 10. Since the last record is not released until substantially the middle of the record changing cycle when the blade 452 of the spindle 52 is actuated. The pawl stop 556 has been moved inwardly against the side of the shank portion 67 of the indexing member 56 before the quadrant lever is cammed upwardly to the position shown in FIG. 10. Accordingly, the shoulder 664 of the quadrant lever 650 is unable to move up beside the edge 582 of the pawl stop 556 and assume the position shown in FIG. 9, and instead engages the underside of the pawl stop 556 and lifts this member upwardly off of the flange portion 558 on which the stop 556 normally rests, as shown in FIG. 10. Accordingly, when the balance arm drops at the middle of the record changing cycle before the last record is played the quadrant lever 650 exercises no control action on the tone arm indexing mechanism with the result that the indexing member 56 is struck by the last record, the pawl stop 556 is positioned in accordance with the particular step 582–584 with which the shank 67 is engaged and the pawl 418 is positioned for engagement with the corresponding step of the tone arm indexing bracket 78 to position the tone arm for engagement with the lead-in groove of the last record.

At the end of the record changing cycle during which the balance arm is dropped, the pawl stop 556 is moved outwardly to the rest position shown in FIG. 8, by engagement of the flange 576 on the cycling slide 370 with the shoulder 578, so that the edge portion 582 of the pawl stop 556 moves beyond the shoulder 664 of the quadrant lever 650 and the pawl stop 556 drops back onto the upper edge of the bracket portion 558 and assumes the position shown in FIG. 9. The quadrant lever is thus placed in the correct position to index the pawl 418 for engagement with the rest position stop 423 during the last record shutoff cycle which is initiated after the last record has been played. It will thus be seen that the quadrant lever 650 may be moved to the controlling position shown in FIG. 9 either by forward movement of the control slide 602, as illustrated in FIG. 9, or by the dropping of the balance arm when the last record is released. However, the controlling action of the quadrant lever in this latter case is not effective immediately since otherwise the tone arm 70 would be placed on the rest post instead of playing the last record.

In accordance with a further important feature of the present invention, the balance arm 58 is employed as a manually adjustable tone arm indexing member so that either a seven inch, ten inch or a twelve inch record on the turntable 54 may be repeated over and over again automatically. Such an arrangement is desirable in many instances, such as the study of languages, dancing instructions, and the like. To this end, the tone arm indexing member 56 is provided with a downwardly extending arm portion 771 (FIG. 9) which extends below the pivot pin 568. The arm 771 is adapted to be engaged by a transverse pin 773 which is connected to the bottom end portion 774 of the balance arm shaft 60. Furthermore, the balance arm mounting arrangement is provided with a suitable detent arrangement so that a slight detent force is provided at positions generally above the edge portion of seven inch, ten and twelve inch records which force may be overcome as the balance arm is moved outwardly from its position adjacent the spindle 52. Such a detent arrangement is conveniently achieved by providing a downwardly projecting dimple 776 (FIG. 5) on the undersurface of the guide arm tip 718 and a series of three indentations 778, 780 and 782 (FIG. 6) formed in the top wall 145 of the main bracket 142. With this arrangement, when the balance arm 58 is lifted upwardly the guide arm tip 718 is moved up within the slot 720 and as the balance arm is then moved outwardly the guide arm tip 718 rests on the upper surface of the top wall 145. When the dimple 776 engages the indentation 778 a slight detent force informs the operator that the balance arm may be left in this position for repeated playing of a seven inch record. Preferably, the balance arm 58 is positioned generally above the lead-in groove of a seven inch record positioned on the turntable 54 when the dimple 776 engages the indentation 778. However, in this position the offset arm 773 does not engage the depending arm portion 771 of the tone arm indexing member 56 so that this member operates in the usual manner to index the tone arm 70 for a seven inch record. Thus, if a seven inch record is manually placed on the turntable 54 while the balance arm is in the above described seven inch position in the general vicinity of the edge portion of a seven inch record the changer of the present invention will play this record repeatedly, the automatic tripping mechanism functioning to initiate a record changing cycle each time the record is played and the tone arm 70 being indexed correctly for engagement with the lead-in groove of the seven inch record at the end of each record changing cycle.

If, now, it is desired to play a ten inch record repeatedly, the balance arm is moved somewhat further outwardly from the spindle 52 until the dimple 776 engages the indentation 780 on the bracket wall 145. When this occurs, the transverse arm 773 engages the arm portion 771 of the indexing member 56 and pivots this member to the ten inch indexing position shown in dotted lines at 590 in FIG. 12. Here again, the position of the balance arm when the dimple 776 engages the indentation 780 is preferably in the general vicinity above the edge of a ten inch record so that the operator is informed that the machine will play a ten inch record repeatedly. If a ten inch record is now placed on the turntable and a record changing cycle is initiated, the changer will play this ten inch record repeatedly and the tone arm will be properly indexed at the end of each record changing cycle for engagement with the lead-in groove of the ten inch record. In this connection it will be understood that the weight of the balance arm assembly holds the dimple 776 within the indentation 780 with sufficient force to overcome the normal biasing force of the spring 574 so that the member 56 is continuously held in the ten inch indexing position 590.

If it is desired to play a twelve inch record repeatedly, the balance arm is moved still further outwardly so that the dimple 776 engages the indentation 782 in which position the balance arm is positioned generally over the outer edge portion of a twelve inch record. During this movement of the balance arm, the transverse arm 773 engages the arm 771 and pivots the indexing member 56 to the twelve inch indexing position shown in dotted lines at 592 in FIG. 12. Accordingly, when a twelve inch record is placed on the turntable and a record changing cycle is initiated the machine will continue to play the twelve inch record over and over again with the tone arm 70 properly indexed to engage the lead-in groove of the twelve inch record at the end of each record changing cycle.

In the illustrated embodiment the above described twelve inch indexing position of the balance arm is utilized as the outermost position of the balance arm to which position the balance arm is moved when a stack of records is to be removed from the turntable after being played. However, it will be understood that a further indentation similar to the indentation 782, may be provided on the top wall 145 to index the balance arm at a point removed from the edge of twelve inch records, for example, to a point over the rest position of the tone arm 70, if such a further detent position is desired. In this latter case, a suitable arrangement should be provided either to provide a clearance for the further movement of the indexing member 56 so that it can move with the transverse arm 773 or a spring biasing arrangement may be employed to prevent further movement of the member 56 when the balance arm is moved from the twelve inch position to this detented rest post position.

In addition to providing the above described repeat play feature for all sizes of records, the control of the indexing member 56 by the positioning of the balance arm 58 in accordance with the present invention has the further advantage that this arrangement may be employed for manual play operation wherein it is not required that the record be repeated. More particularly, if a record of any diameter is to be played manually, it may be placed on the turntable 54 and the balance arm moved to the corresponding index position as determined by the above described detent action between the dimple 776 and the indentations on the top wall 145. For example, if a seven inch record is placed on the turntable, the balance arm is moved so that the dimple 776 engages the indentation 778. When the changer is turned on and a record changing cycle is initiated, the tone arm will be lifted off of the rest post 72 and will be automatically positioned over the lead-in groove of the seven inch record and lowered into engagement therewith. In a similar manner, if a ten inch record is placed on the turntable, the balance arm is moved to the ten inch indexing position as determined by the detent action of the dimple 776 and the indentation 780 and when a record changing cycle is initiated the tone arm will be automatically positioned and lowered into engagement with the lead-in groove of the ten inch record. If a twelve inch record is to be played manually, the balance arm may be moved to the twelve inch indexing position and the tone arm automatically deposited in the lead-in groove of the twelve inch record. This manual play arrangement of the present invention thus avoids the condition wherein the operator must grab the tone arm and position it manually on the record, which is undesirable because the operator may scratch the record when he positions the tone arm stylus on it. Such a condition occurs however, in those changers in which no provision is made for indexing the tone arm during manual play since in most of these arrangements the tone arm is indexed to a seven inch record position irrespective of the size of the record placed on the turntable for manual play.

It will also be noted that with the above described balance arm indexing arrangement, when the balance arm 58 is moved outwardly to the twelve inch record position, the tone arm 70 is controlled as though a twelve inch record were being played and is lowered downwardly at a point beyond the edge of the turntable 54. Thus, if for any reason an automatic record changing cycle is initiated while a record is not on the turntable, the positioning of the balance arm 58 in the above described twelve inch indexing position assures that the tone arm will not be deposited on the surface of the turntable 54 with consequent damage to the stylus thereof.

While there has been illustrated and described a preferred embodiment of the present invention, it will be understood that numerous changes and modifications will occur to those skilled in the art, and it is intended in the appended claims to cover all those changes and modifications which fall within the true spirit and scope of the present invention.

I claim:

1. In an automatic record changer, a rotatable turntable for supporting records to be played, the records to be played including seven inch, ten inch and twelve inch records, a spindle at the center of said turntable, automatic record changing means for successively releasing individually ones of a stack of records positioned on said spindle during successive record changing cycles, a balance arm pivotally mounted adjacent said turntable and movable from a position beyond the edge of said turntable to a position resting on the record stack, and means responsive to movement of said balance arm to a predetermined position for causing said automatic record changing means to repeatedly play the uppermost record on said turntable irrespective of the diameter thereof.

2. In an automatic record changer, a tone arm, a rotatable turntable for supporting records to be played, the records to be played including seven inch, ten inch and twelve inch records, a spindle at the center of said turntable, automatic record changing means for successively releasing individual ones of a stack of records positioned on said spindle during successive record changing cycles, a balance arm pivotally mounted adajcent said turntable and movable from a position beyond the edge of said turntable to a position resting on the record stack, and means responsive to movement of said balance arm to a predetermined position for causing said automatic record changing means automatically to position said tone arm for engagement with the lead-in groove of a record manually deposited on said turntable.

3. In an automatic record changer, a rotatable turntable for supporting records to be played, a record supporting spindle positioned at the center of said turntable, a tone arm adjacent said turntable, automatic record changing means for depositing a record supported on said spindle onto said turntable and lowering said tone arm into engagement therewith, a balance arm pivotally mounted adjacent said turntable and movable from a first position beyond the edge of said turntable to a second position resting on a record supported on said spindle, and means responsive to the positioning of said balance arm at a predetermined position intermediate said first and second positions for causing said record changing means to move said tone arm upwardly and outwardly after the record has been played and inwardly and downwardly into engagement with the initial grooves thereof so that the record may be repeatedly played.

4. In an automatic record changer, a rotatable turntable for supporting records to be played, a record supporting spindle positioned at the center of said turntable, a tone arm adjacent said turntable, automatic record changing means for depositing a record supported on said spindle onto said turntable and lowering said tone arm into engagement therewith, a balance arm pivotally mounted adjacent said turntable and movable from a first position beyond the edge of said turntable to a second position resting on a record supported on said spindle, means responsive to the positioning of said balance arm at a predetermined position intermediate said first and second positions for causing said record changing means to move said tone arm upwardly and outwardly after the record has been played and inwardly and downwardly into engagement with the initial grooves thereof so that the record may be repeatedly played, and means responsive to the positioning of said balance arm to different intermediate positions for indexing said tone arm to different initial positions so that records of different diameters may be individually played repeatedly in accordance with the positioning of said balance arm.

5. In a record changer, a rotatable turntable for supporting records to be played, the records to be played including a first group of relatively small diameter records and a second group of larger diameter records, a centering spindle at the axis of said turntable, means for supporting a stack of records to be played on said spindle in non-playing position above said turntable, a tone arm positioned adjacent said turntable, automatic record changing means for successively releasing individual records of the stack to the turntable during successive record changing cycles, a tone arm indexing member, said tone arm indexing member when in a first position being arranged to be moved to a second position by engagement with the outer edge portion of a larger diameter record as said record is released to the turntable during a record changing cycle, said automatic record changing means including means responsive to the positioning of said tone arm indexing member to said first and second positions for positioning said tone arm on the uppermost record on said turntable in accordance with the diameter thereof, a balance arm pivotally supported adjacent said turntable and movable from a rest position beyond the edge of the record stack to a position on top of the uppermost record of the stack supported on said spindle, and means responsive to the positioning of said balance arm in said rest position for positioning said tone arm indexing member in said second position, whereby said tone arm is indexed to engage larger diameter records irrespective of the diameter of the uppermost record on said turntable when said balance arm is in said rest position.

6. In a record changer, a rotatable turntable for supporting records to be played, the records to be played including a first group of relatively small diameter records and a second group of larger diameter records, a centering spindle at the axis of said turntable, means for supporting a stack of records to be played on said spindle in non-playing position above said turntable, a tone arm positioned adjacent said turntable, automatic record changing means for successively releasing individual records of the stack to the turntable during successive record changing cycles, a tone arm indexing member, said tone arm indexing member when in a first position being arranged to be moved to a second position by engagement with the outer edge portion of a larger diameter record as said record is released to the turntable during a record changing cycle, said automatic record changing means including means responsive to the positioning of said tone arm indexing member to said first and second positions for positioning said tone arm on the uppermost record on said turntable in accordance with the diameter thereof, a balance arm pivotally supported adjacent said turntable and movable from a rest position beyond the edge of the record stack to a position on top of the uppermost record of the stack supported on said spindle, and means responsive to the positioning of said balance arm in said rest position for moving said tone arm indexing member to said second position and holding the same in said second position, whereby said tone arm is indexed to engage larger diameter records irrespective of the diameter of the uppermost record on said turntable when said balance arm is in said rest position.

7. In a record changer, a rotatable turntable for supporting records to be played, the records to be played including a first group of relatively small diameter records and a second group of records having a diameter larger than said turntable, a centering spindle at the axis of said turntable, means for supporting a stack of records to be played on said spindle in non-playing position above said turntable, a tone arm positioned adjacent said turntable, automatic record changing means for successively releasing individual records of the stack to the turntable during successive record changing cycles, a tone arm indexing member, said tone arm indexing member when in a first position being arranged to be moved to a second position by engagement with the outer edge portion of a larger diameter record as said record is released to the turntable during a record changing cycle, said automatic record changing means including means responsive to the positioning of said tone arm indexing member to said first and second positions for positioning said tone arm on the uppermost record on said turntable in accordance with the diameter thereof, a balance arm pivotally supported adjacent said turntable and movable from a rest position beyond the edge of the record stack to a position on top of the uppermost record of the stack supported on said spindle, and means responsive to the positioning of said balance arm in said rest position for moving said tone arm indexing member to said second position and holding the same in said second position, whereby said tone arm is indexed as though a larger diameter record is to be played irrespective of the actual diameter of this record and said tone arm is moved downwardly at a point beyond the edge of said turntable when said balance arm is in said rest position.

8. In an automatic record changer, a rotatable turntable for supporting records to be played, a record supporting spindle positioned at the center of said turntable, a tone arm adjacent said turntable, automatic record changing means for depositing a record supported on said spindle onto said turntable and lowering said tone arm into engagemet therewith, a balance arm pivotally mounted adjacent said turntable and movable from a first position beyond the edge of said turntable to a second position resting on a record supported on said spindle, means responsive to the positioning of said balance arm at a predetermined position intermediate said first and second positions for causing said record changing means to move said tone arm upwardly and outwardly after the record has been played and inwardly and downwardly into engagement with the initial grooves thereof so that the record may be repeatedly played, detent means for restraining said balance arm in different intermediate positions corresponding to records of different diameters, and means responsive to the positioning of said balance arm in said different intermediate positions for indexing said tone arm to different initial positions so that records of different diameters may be individually played repeatedly in accordance with the positioning of said balance arm.

References Cited

UNITED STATES PATENTS 3,181,872  5/1965  Dvorin _____________ 274—10 X

HARRY N. HAROIAN, Primary Examiner